United States Patent [19]

Schopper et al.

[11] Patent Number: 4,493,508
[45] Date of Patent: Jan. 15, 1985

[54] DUAL-CIRCUIT PRESSURE CONTROL VALVE

[75] Inventors: Bernd Schopper, Hattersheim; Peter Tandler, Falkenstein, both of Fed. Rep. of Germany

[73] Assignee: ITT Industries, Inc., New York, N.Y.

[21] Appl. No.: 438,195

[22] Filed: Nov. 1, 1982

Related U.S. Application Data

[63] Continuation-in-part of Ser. No. 231,692, Feb. 5, 1981, abandoned.

[51] Int. Cl.³ .......................... B60T 11/34; B60T 8/26
[52] U.S. Cl. ..................................... 303/6 C; 188/349
[58] Field of Search ..................... 303/6 C, 6 R, 22 R, 303/22 A, 6 A, 52, 40, 84 R; 188/349, 195, 345, 16, 354; 60/591

[56] References Cited

FOREIGN PATENT DOCUMENTS

| 111062 | 8/1979 | Japan | 303/6 C |
| 50837 | 5/1981 | Japan | 303/6 C |
| 2008216 | 5/1979 | United Kingdom | |
| 2071243 | 9/1981 | United Kingdom | 303/6 C |

Primary Examiner—Douglas C. Butler
Attorney, Agent, or Firm—James B. Raden; William J. Michals

[57] ABSTRACT

Dual-circuit pressure control valves are known in which the two control pistons are acted upon by a common preloading force through the intermediary of a preload distributor. The disadvantage of the known devices is that the valve closure travel is great resulting in a large fluid volume input to the control valve. According to the present invention this disadvantage is overcome by providing adjustable stops which cooperate with corresponding extensions of the distributor as soon as an unsymmetrical mode of operation of the valves occurs.

1 Claim, 1 Drawing Figure

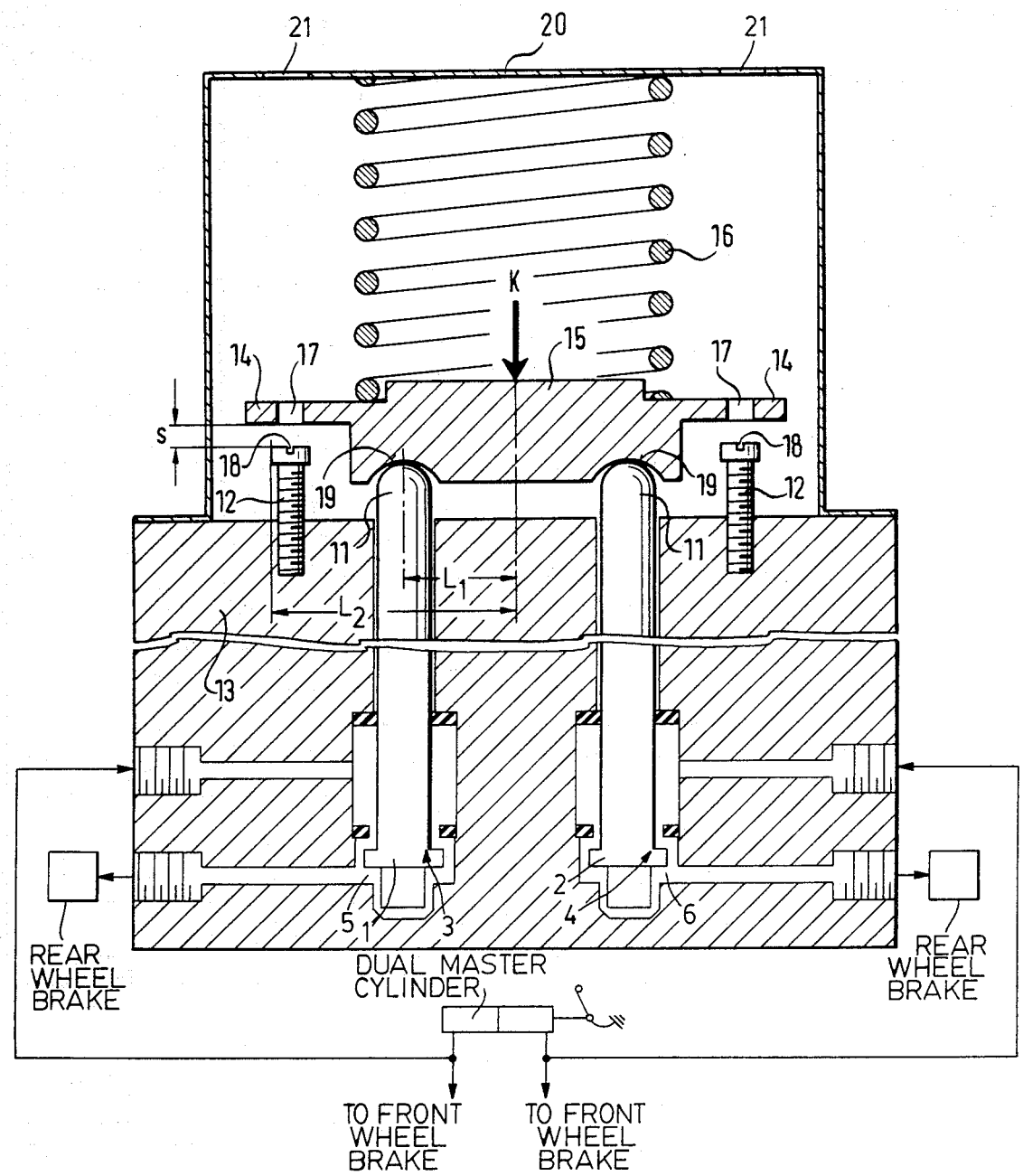

DUAL-CIRCUIT PRESSURE CONTROL VALVE

CROSS-REFERENCE TO RELATED APPLICATIONS

This is a continuation-in-part application of prior application Ser. No. 231,692, filed Feb. 5, 1981, now abandoned.

BACKGROUND OF THE INVENTION

The present invention relates to a dual-circuit pressure control valve having a change-over point determined from the outside by a control force for use in hydraulic dual-circuit brake systems of automotive vehicles. The pressure control valve includes two cylinders each connected to a different one of the two brake circuits arranged parallel to each other and housing therein the control pistons whose actuating tappets project outwardly on the same end face of the cylinder housing and abut a common yoke which is acted upon by the control force from the opposite side.

In a known dual-circuit pressure control valve (U.K. Pat. No. 2,008,216A) the two control pistons are acted upon by the pressure of two separate rear-wheel brake circuits. As soon as the pressure exceeds a predetermined value (change-over point), the two control pistons are moved in opposition to the control force which is preferably generated by a helical spring, thereby causing closure of a valve which is located between the master brake cylinder and the wheel cylinders. In this way, the pressure in the rear-wheel brake cylinders rises more slowly beginning at the change-over point than in the master brake cylinder.

The disadvantage of the known dual-circuit pressure control valves is that the valve closure travels up to exceeding the change-over point are comparatively long so that a comparatively large amount of fluid volume is input to the control valve for actuating the control pistons.

SUMMARY OF THE INVENTION

It is, therefore, an object of the present invention to provide a dual-circuit pressure control valve of the type referred to hereinabove, in which the valve closure travels of the control valve are reduced to a minimum in order to decrease the fluid volume input of the control valve to a value as low as possible and, in addition to this, to guarantee, in the event of failure of one circuit, an increase of the change-over point of the intact circuit in a simple way.

A feature of the present invention is the provision of a dual-circuit pressure control valve having a change-over point determined from the outside by a control force for use in a hydraulic dual-circuit brake system of automotive vehicles comprising: a housing having two parallel control valve actuating tappets projecting outwardly from and disposed along a common line in one end surface of the housing, each of the two actuating tappets enabling a control of pressure in a different one of the two brake circuits; a common yoke having one surface abutting each of the two actuating tappets and the opposite surface acted upon by the control force, the yoke having two extensions each extending in opposite directions from the yoke along and parallel to the common line; and a pair of adjustable stops disposed in the one end surface along the common line, each of the pair of stops being spaced from a different one of the two actuating tappets to cooperate with an associated one of the two extensions such that each of the two extensions move into abutment with its associated one of the pair of stops when the associated one of the two actuating tappets has moved into the housing.

In this arrangement, each of the stops is located in accordance with the present invention such that the associated extension abuts the associated stop immediately after opening of the valve. Comparatively large closure travels of 2.5 to 3 mms (millimeters), for example, are necessary without such stops for safeguarding a reliable opening of the valves even in an unfavorable manufacturing tolerance situation in case of a change-over pressure increase of the intact circuit being required upon failure of the other circuit. By suitably arranging the stops in accordance with the present invention, the valve closure travel may be adjusted to approximately 0.5 mms without the change-over pressure increase being impaired thereby. This results in an essentially reduced fluid volume input. With the control valve operating normally, the closure travel is always covered by both pistons at the same time.

The yoke is preferably acted upon by the control force in the middle between the two actuating tappets, the control force being suitably generated by a helical spring acting on the yoke.

When an extension abuts its assigned stop, the present invention favorably causes an amplification of the control force at the actuating tappet assigned to the other stop due to a lever action provided by the yoke and extensions acted upon by the force with the stop against which the extension abuts acting as a fulcrum. In an expedient manner, this produces an effect to the end that there occurs a simultaneous opening of both valves. The effect is particularly advantageous in the event of failure of one brake circuit, since a higher braking force is thereby enabled in the remaining or intact brake circuit by increasing the changeover force.

The amplification factor brought about by abutment of one of the extensions at its assigned stop ranges suitably between 1.2 and 1.4 and preferably about 1.3.

In a preferred arrangement, both stops are spaced equidistant from the associated actuating tappet, so that equal amplification factors prevail for both control pistons, if the extension remote from the control pistons bears against the assigned stop.

It is particularly advantageous, if the stops are adjustable stop screws which are able to be screwed in corresponding bores of the housing to a predetermined depth. Thus, the closure travel of the control pistons may be adjusted to the lowest possible value even after assembly of the device. The method of adjustment will be described in detail later on.

To facilitate the adjustment, according to an advantageous embodiment of the present invention, each extension includes opposite to the stop screw a bore having a smaller diameter than the head of the stop screw. A screw driver is, for instance, able to be passed through the bore, which screw driver is able to engage in a corresponding slot in the head of the stop screw.

BRIEF DESCRIPTION OF THE DRAWINGS

The above mentioned and other features and objects of the present invention and the manner of obtaining them will become more apparent by reference to the following description taken in conjunction with the drawing, the single FIGURE of which is a schematical longitudinal cross sectional view of a dual-circuit pressure control valve in accordance with the principles of the present invention.

DESCRIPTION OF THE PREFERRED EMBODIMENT

Referring to the FIGURE, located side by side and in parallel to each other in the control valve housing 13 are two control pistons 1 and 2 whose actuating tappets 11 project from the same wall of housing 13. Bearing against actuating tappets 11 are two indentations 19 on an adjacent side of a yoke 15 which are spaced from each other. Yoke 15 is acted upon symmetrically relative to the two tappets 11 by a helical spring 16 extending between the side of yoke 15 remote from actuating tappets 11 and a spring bearing 20 secured to housing 13. Thus, helical spring 16 exerts a control force K on yoke 15, the line of application of force K being disposed midway between the two actuating tappets 11.

Provided on both sides of yoke 15 are extensions 14, which extend beyond actuating tappets 11 and which cooperate with stop screws 12 screwed in tapholes of housing 13. The heads of stop screws 12 include slots 18 for insertion of a screw driver therein. Opposite to slots 18, bores 17 are provided in extensions 14 and openings 21 are provided in spring bearing 20 to enable passing a screw driver therethrough to engage slots 18.

According to the present invention, the distance "s" between the head of stop screws 12 and extensions 14 will be adjusted in the following manner.

First of all, the valves 3 and 4 are urged to their closed position by pressure build-up in chambers 5 and 6, each of which are coupled to a different one of the two rear wheel brakes. In this position, stop screws 12 are turned by means of a screw driver inserted through bores 17 and openings 21 until the defined distance "s" relative to extensions 14 of yoke 15 is achieved. The pressure in chambers 5 and 6 will be decreased afterwards, whereupon extensions 14 and 15 abut the heads of stop screws 12. As a result, the valve closure travel of both valves is defined exactly.

The distance of actuating tappets 11 from the line of application of control force K is designated by $L_1$ and the distance of stops 12 from the line of application of control force K is designated by $L_2$. When one of extensions 14 abuts the associated stop screw 12 first, the control force acting on the other actuating tappet 11 will increase due to leverage provided by extensions 14 and yoke 15, with yoke 15 being acted upon by force K and with the stop screw 12 against which extensions 14 abut acting as a fulcrum. The resultant amplification factor V provided by this leverage is given by the classical lever formula when the fulcrum is disposed outside the point the force is applied to the lever and outside the point upon which the lever acts, as follows:

$$V = (2 \cdot L_2)/(L_2 L_1).$$

By suitably choosing the distance $L_2$, in particular, it is possible to select the desired amplification factor which is important also in the event of failure of one brake circuit, because the braking force in the still remaining or intact brake circuit will be accordingly increased above the change-over point.

While we have described above the principles of our invention in connection with specific apparatus, it is to be clearly understood that this description is made only by way of example and not as a limitation to the scope of our invention as set forth in the objects thereof and in the accompanying claims.

We claim:

1. A dual-circuit pressure control valve having a change-over point determined from the outside by a control force for use in a hydraulic dual-circuit brake system of automotive vehicles comprising:

a housing having two parallel control valve actuating tappets projecting outwardly from and disposed along a common line in one end surface of said housing, each of said two actuating tappets enabling a control of pressure in a different one of said two brake circuits;

a common yoke having one surface abutting each of said two actuating tappets and the opposite surface acting upon by said control force, said yoke having two extensions each extending in opposite directions from said yoke along and parallel to said common line wherein said yoke is acted upon by said control force intermediate said two tappets and wherein said control force is generated by an elongated helical spring held at one end by a spring bearing housing and acting at the other end on said yoke;

a pair of valves in said housing respectively cooperating with the inner ends of said tappets, each valve comprising a piston on the inner end of the associated tappet which is disposed in a cylindrical chamber which surrounds the inner end of the associated tappet, wherein outward movement of the associated tappet closes the piston against a valve seat surface of the respective chamber;

a pair of adjustable stops disposed in said one end surface between said yoke and said housing and along said common line, each of said pair of stops being spaced from an associated one of said two extensions by a predetermined distance when said valves are closed and each of said pair of stops being spaced from a different one of said two actuating tappets to cooperate with the associated one of said two extensions such that each of said two extensions moves into abutment with its associated one of said pair of stops when the associated one of said two actuating tappets has moved into said housing and wherein the valve closure travel of said valves is controlled by the predetermined spacing between the extensions of said yoke and said adjustable stops, each of said pair stops being an adjustable stop screw capable of being screwed to a predetermined depth into a corresponding bore in said one end surface of said housing, each of said two extensions including a bore opposite an associated one of said stop screws, said bore having a smaller diameter than the head of said associated one of said stop screws;

and access means for enabling a separate adjustment of each of said stop screws, said access means comprising a pair of openings in said spring bearing housing aligned with heads on said stop screws, whereby each of said stop screws may be screwed into or out of said corresponding bore by a tool inserted through said openings.

* * * * *